United States Patent
Tsang

(10) Patent No.: US 7,530,457 B2
(45) Date of Patent: May 12, 2009

(54) SWIVEL-LID PROTECTIVE CASE

(76) Inventor: Chun Chee Tsang, Room 2812, Metro Plaza, Tower II, 223 Hing Fong Road, Kwai Fong, Hong Kong (CN)

(*) Notice: Subject to any disclaimer, the term of this patent is extended or adjusted under 35 U.S.C. 154(b) by 442 days.

(21) Appl. No.: 11/265,453

(22) Filed: Nov. 2, 2005

(65) Prior Publication Data

US 2007/0095687 A1 May 3, 2007

(51) Int. Cl.
- B65D 85/00 (2006.01)
- B65D 5/52 (2006.01)
- B65D 25/24 (2006.01)
- B65D 43/14 (2006.01)
- B65D 51/04 (2006.01)

(52) U.S. Cl. .............. 206/320; 206/45.23; 220/817; 220/818

(58) Field of Classification Search ............ 206/305, 206/320, 576, 751, 759, 762, 45.23, 45.2, 206/45.28; 220/812, 817, 818, 821, 826, 220/810; 150/154

See application file for complete search history.

(56) References Cited

U.S. PATENT DOCUMENTS

| | | | |
|---|---|---|---|
| 1,473,162 A | 11/1923 | Sage | |
| 1,688,042 A | 10/1928 | Gaess | |
| 2,145,212 A | 1/1939 | Edwards et al. | |
| 2,978,004 A | 4/1961 | Smith | |
| 3,262,714 A | 7/1966 | Langone | |
| 3,323,755 A | 6/1967 | Voitas et al. | |
| 3,360,116 A | 12/1967 | Somers et al. | |
| 3,476,123 A | 11/1969 | Flax | |
| 3,613,873 A * | 10/1971 | Schulman | 206/752 |
| 4,440,382 A | 4/1984 | Pruvot et al. | |
| 4,807,773 A | 2/1989 | Tsai | |
| 5,022,516 A | 6/1991 | Urban et al. | |
| 5,035,344 A | 7/1991 | Christopher | |
| 5,078,159 A * | 1/1992 | Yuhara | 132/295 |
| D350,625 S | 9/1994 | Shen | |
| 5,392,943 A | 2/1995 | Delatte et al. | |
| 5,435,358 A | 7/1995 | Kempka et al. | |
| 5,596,789 A | 1/1997 | Simioni | |
| 5,608,158 A | 3/1997 | Neiderberger et al. | |
| 5,884,341 A | 3/1999 | Boardman et al. | |
| 5,921,425 A | 7/1999 | Markey | |
| 6,014,978 A * | 1/2000 | Yuhara | 132/293 |
| 6,070,749 A | 6/2000 | Joulia | |
| 6,129,237 A * | 10/2000 | Miyahara | 220/812 |
| 6,257,873 B1 | 7/2001 | Song | |
| 6,378,533 B1 | 4/2002 | Roman | |
| 2003/0150756 A1 | 8/2003 | Kajiya | |
| 2004/0056035 A1* | 3/2004 | Baker et al. | 220/345.1 |
| 2004/0228081 A1* | 11/2004 | Lee | 361/683 |
| 2005/0173434 A1 | 8/2005 | O'Neal | |
| 2006/0096611 A1* | 5/2006 | Leppla et al. | 132/294 |

* cited by examiner

*Primary Examiner*—Mickey Yu
*Assistant Examiner*—Melissa L Lalli
(74) *Attorney, Agent, or Firm*—Patricia M. Mathers

(57) ABSTRACT

A protective case with a combination hinge and swivel connector for the lid. The lid opens in clamshell fashion and then swivels around and folds down over the back of the case so that the back of the shell nests in the lid. The lid, when folded back in this manner, provides a comfortable surface for holding the open case in the hand.

2 Claims, 5 Drawing Sheets

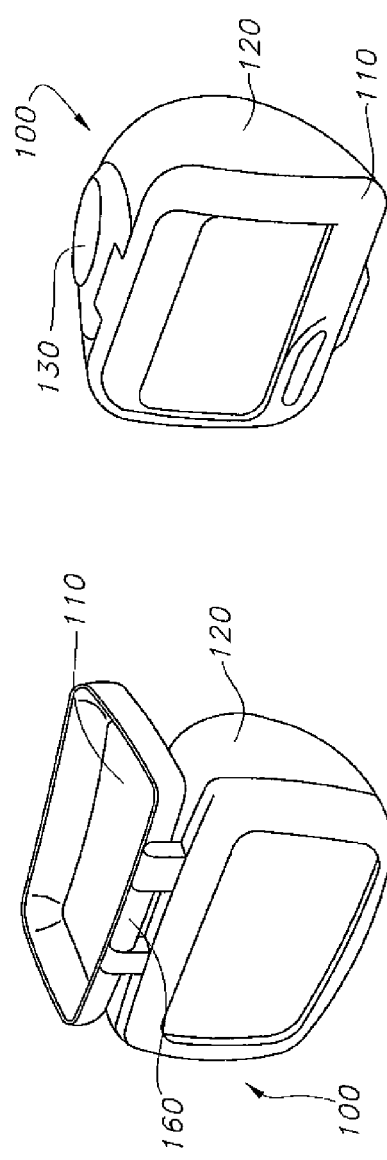
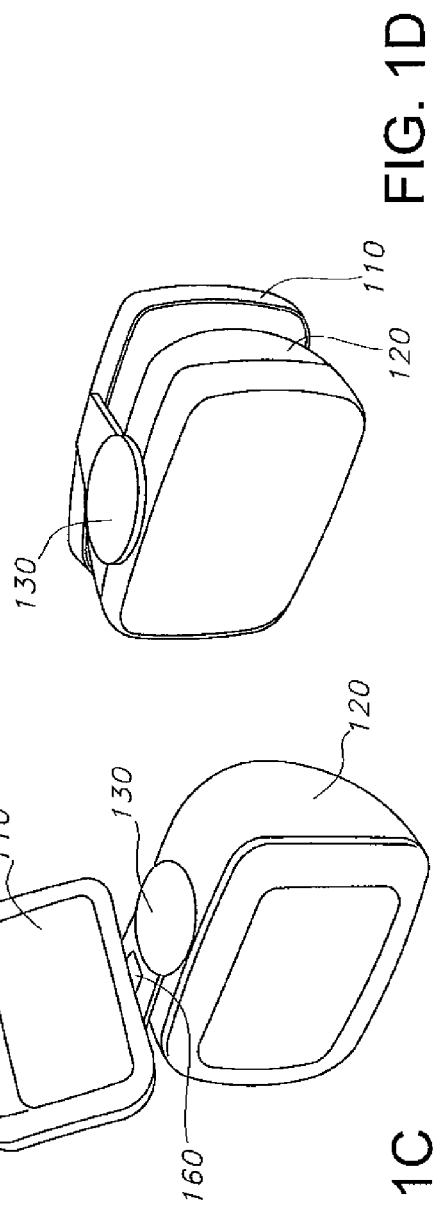
FIG. 1A
FIG. 1B
FIG. 1C
FIG. 1D

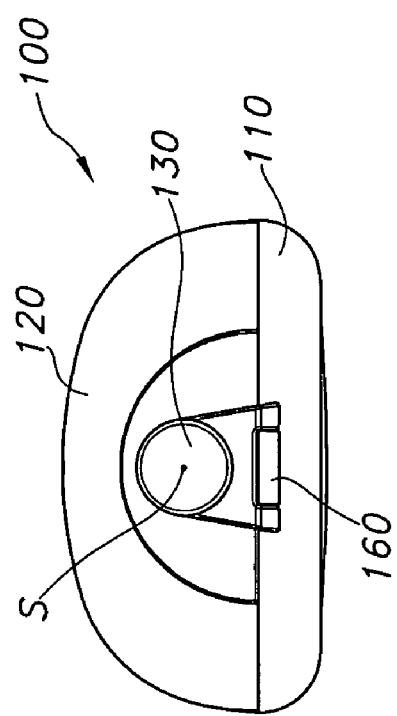
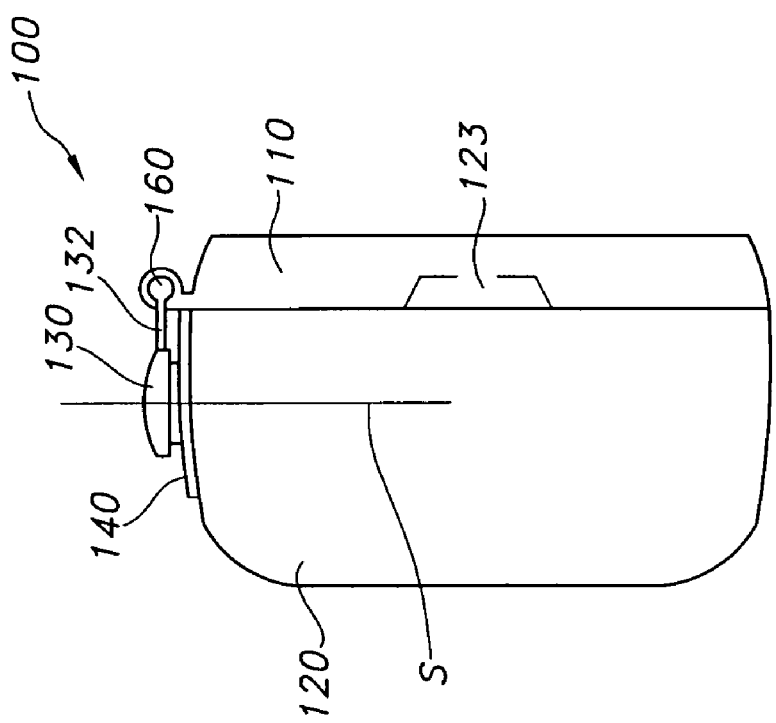
FIG. 2A
FIG. 2B

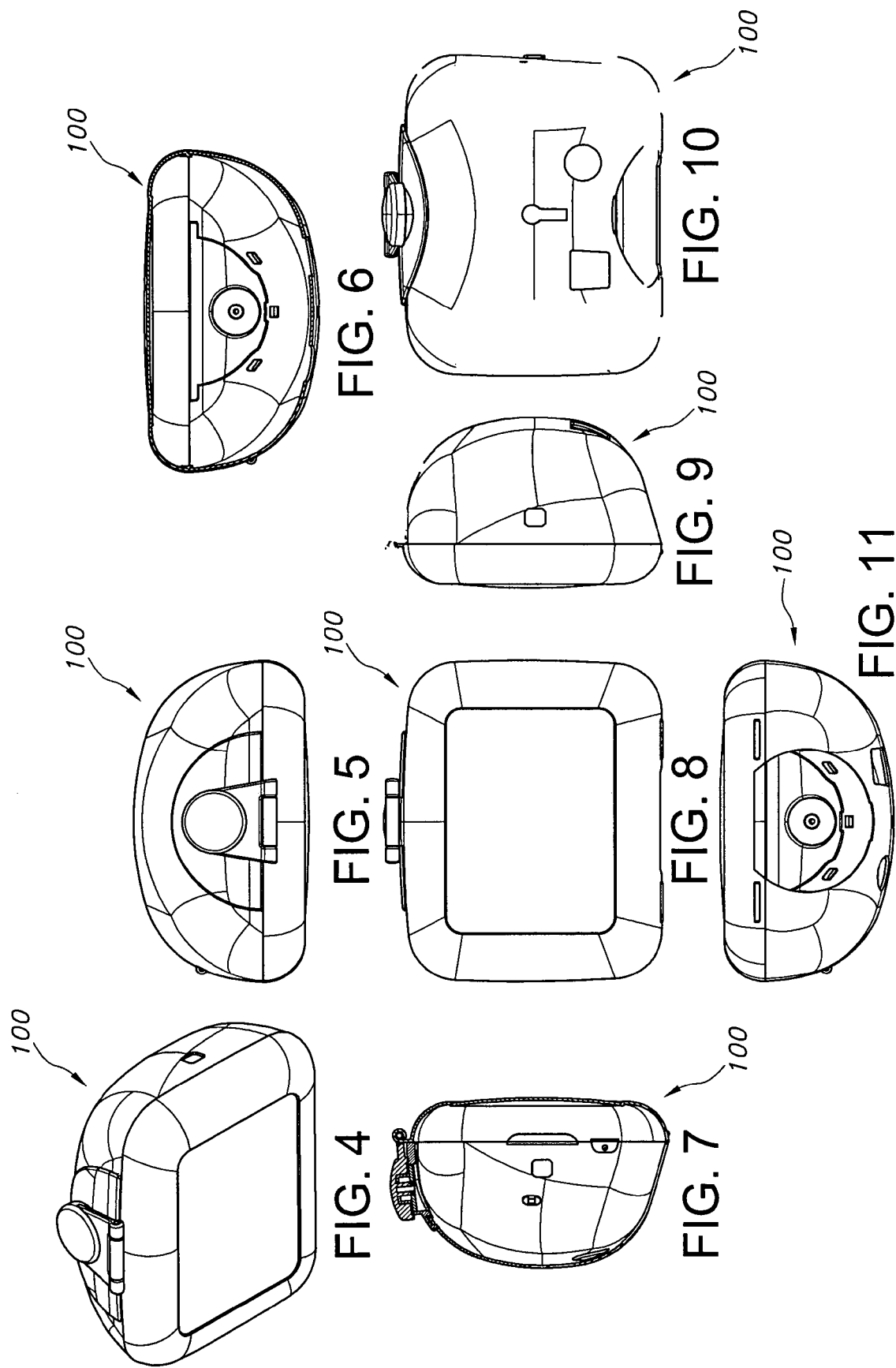

SWIVEL-LID PROTECTIVE CASE

BACKGROUND INFORMATION

1. Field of the Invention

The invention relates to the field of storage cases or protective cases for devices. More particuarly the invention relates to a protective case with a hinged lid that folds back so as to allow unimpeded use of the device in the case.

2. Description of the Prior Art

A user of an electronic handheld device often carries the device in a protective case. Typically, the protective case is constructed of a sturdy, rigid material that protects the handheld device from damage. Ideally, the case allows the user access to the device in a manner that makes it readily available for immediate use. A PDA (Personal Digital Assistant) and a cellphone are examples of handheld devices that a user may carry in a protective case.

Often, the handheld device must be removed from its case in order to be used. Many cases, however, have detachable lids that allow the device to be used in a case with the lid removed. Such cases have a disadvantage in that the user must keep track of the whereabouts of the lid and/or case. Some protective cases have a hinged lid so that the device can remain in the protective case while it is being used. These cases have a disadvantage in that the user must contend with the open lid and it may be difficult or cumbersome to operate the device in the case. Still other cases have a hinged lid that flips over the back of the case, but such cases are difficult or uncomfortable to hold in the hand because of the contour of the reversed lid. It is a further disadvantage that footprint of the case plus open lid may be twice the footprint of the case alone or with the lid closed.

What is needed, therefore, is a protective case that provides a lid that opens so that the device stored within it may be used in-situ. What is further needed is such a case in which the lid remains attached to the protective case. What is yet further needed is such a case with a lid that may be stored in such a way as to not encumber the use of the device. What is still yet further needed is such a case that allows the lid to be stored without significantly increasing the footprint of the case.

BRIEF SUMMARY OF THE INVENTION

For the reasons cited above, it is an object of the present invention to provide a protective case with an attached and hinged lid. It is a yet further object to provide a protective case that stores the open, attached lid behind the case.

The objects of the invention are achieved by providing a swivel-lid protective case. The case has a shell, a lid, and a strap that connects the lid to the shell. The lid is attached to the strap by means of a hinge and the strap attached to the shell by means of a swivel connector that is rotatable about a swivel point. The hinge means allows the protective case to open in a clam shell fashion. The swivel means allows the lid, after it has been raised up above the shell, to swivel about the swivel axis and fold down along the hinge means over the back of the shell. In this manner, access to the front operative surface of the device stored in the protective case is unimpeded, yet at the same time, the lid remains attached and does not increase the need for space when using the device. Furthermore, the lid, when folded back and nesting against the back of the shell, provides a comfortable surface when holding the open case in the hand.

The swivel-lid protective case according to the invention may be used to store any kind of device or item. The shape and contour of the case may be constructed to securely accommodate a particular device. Apertures may be provided in the protective case to provide access to connectors or buttons on the device and the case may be lined with shock absorbing material.

The swivel-lid protective case is constructed of a material that is suitable to provide the necessary protection for the device or item to be stored within. For example, if the device is a handheld electronic device, suitable material is a form rigid material, such as a metal, plastic, hard rubber, or other form-rigid material that has the necessary rigidity and strength to protect the device. For other types of items, the swivel-lid protective case may be constructed of a softer, more flexible material. The case may have a standard shape, for example, rectangular, in order to accommodate any number of items or devices or may be constructed to hold a specific device. Regardless of the shape or construction of the case, the inventive feature is the double-hinged lid that provides unimpeded access to whatever is stored within the case and allows the lid to be stored unobtrusively behind the shell, without first detaching the lid.

BRIEF DESCRIPTION OF THE DRAWINGS

The present invention is described with reference to the accompanying drawings. In the drawings, like reference numbers indicate identical or functionally similar elements.

FIG. 1A is a perspective view of protective case in the closed position.

FIG. 1B is a perspective view of the protective case with the lid open in clamshell fashion.

FIG. 1C is a perspective view of the protective case with the lid rotating about the swivel axis.

FIG. 1D is a perspective view of the protective case with the lid in a stored position.

FIG. 2A is a side planar view of the protective case.

FIG. 2B is a top planar view of the protective case.

FIG. 4 is a perspective view of a particular embodiment of the swivel-lid protective case according to the invention.

FIG. 5 is a top planar view of the swivel-lid protective case of FIG. 4.

FIG. 6 is a bottom planar view of the swivel-lid protective case of FIG. 4.

FIG. 7 is a first side elevational view of the swivel-lid protective case of FIG. 4.

FIG. 8 is a front elevational view of the swivel-lid protective case of FIG. 4.

FIG. 9 is a second side elevational view of the swivel-lid protective case of FIG. 4.

FIG. 10 is a rear elevational view of the swivel-lid protective case of FIG. 4.

FIG. 11 is bottom planar view of the swivel-lid protective case of FIG. 4.

DETAILED DESCRIPTION OF THE INVENTION

Figure 3:
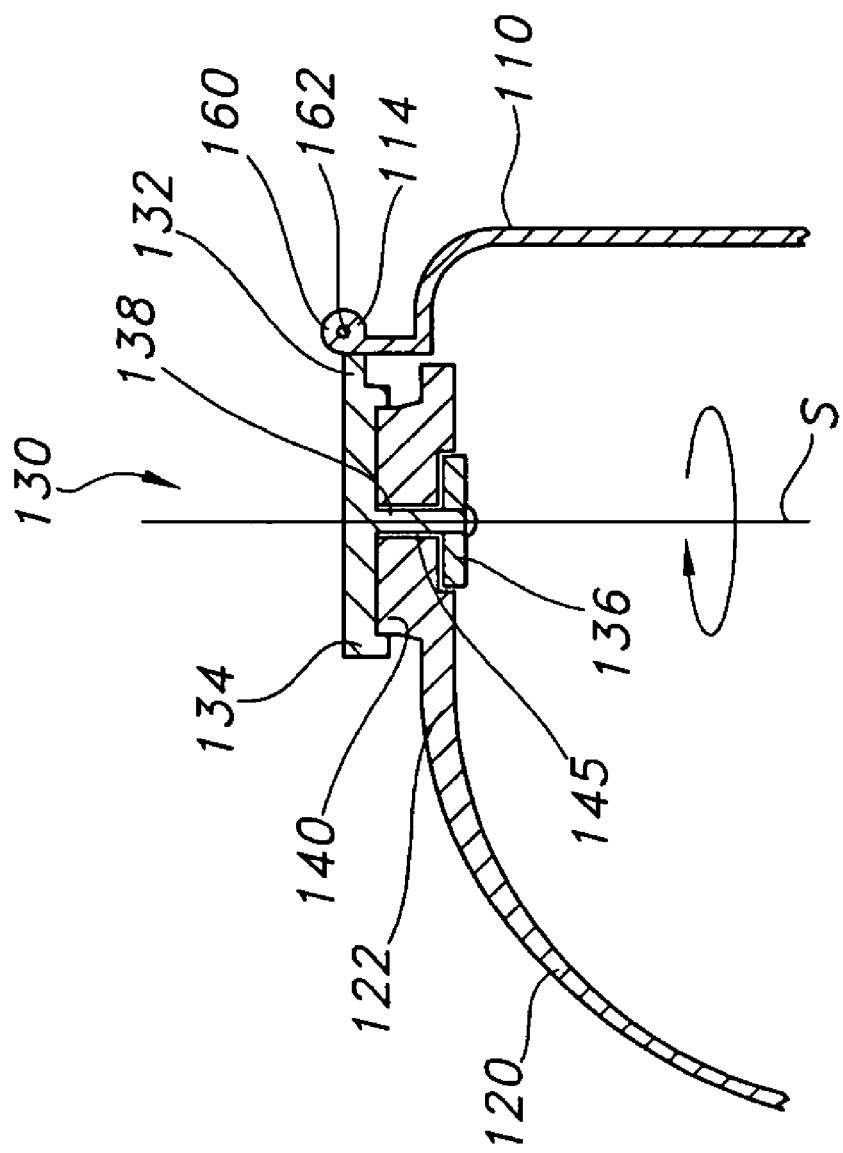
FIG. 3 is a cross-sectional view of the swivel means.

FIGS. 1A-1D illustrate a swivel-lid protective case 100 according to the invention. The swivel-lid protective case 100 comprises a lid 110, a shell 120, and a swivel means 130. FIG. 1A shows the swivel-lid protective case 100 in a closed position. FIGS. 1B-1D show the lid 110 being manipulated from an open position (FIG. 1B), swiveling about the top of the shell 120 (FIG. 1C) and then folded down into a storage position (FIG. 1D). In the storage position, a user has full access to the operative surface of a device held in the swivel-lid protective case 100, yet the lid 110 remains attached to the swivel-lid protective case 100 and out of the way. A key feature of the invention is the ability of the lid 110 and to rotate in two directions relative to the shell 120. The swivel-lid protective case 100 pivotally opens and closes in clamshell fashion along the plane of a hinge 160. The lid 110, when open, is able to pivot rotationally 360 degrees in a plane about a swivel axis S relative to the shell 120. The swivel axis S is best seen in FIGS. 2A, 2B, and 3. It is understood that the shape and size of the swivel-lid protective case 100 are based upon the intended use of the case and may vary widely.

FIGS. 2A, and 2B illustrate, respectively, side and top planar views of a swivel-lid protective case 100 according to the invention. The swivel-lid protective case 100 has a closure means 123 for holding the lid 110 closed against the shell 120. In the embodiment shown, the closure means 123 is a tab on the shell 120 that provides an interference fit against the inside of the lid 110. Any suitable closure means may be used, such as snap pawls, snap buttons, latches, interference fits, etc.

FIG. 3 illustrates the swivel means 130 according to the invention. The swivel means 130 includes a strap 132 with the hinge 160 at one end and, at the other end, a swivel connector 134 that is attached to the shell 120 and that rotates about a swivel axis S. The swivel connector 134 includes a swivel plate 136 and a swivel post 138. A through-bore 145 is provided in the shell 120. The swivel post 138 is inserted through the swivel plate 136 and the through-bore 145 and fixedly attached to the swivel connector 134 so as to allow the swivel connector 134 to rotate freely about the swivel axis S, which, in this configuration, is provided by the swivel post 138. The hinge 160 includes a hinge pin 162 that is mounted in the strap 132 and a hinge sleeve 114 on the lid 110 that couples with the hinge pin 162.

The lid 110 is opened by rotating it upward about the hinge 160. Referring again to FIG. 1C and 1D, once the lid 110 is raised completely above the shell 120, the lid 110 is freely rotatable about the swivel axis S.

It is understood that any suitable means of connecting the swivel connector 134 to the shell 120, so that the strap 132 may rotate at least 180 degrees about a swivel axis S is included within the scope of the invention. In the embodiment shown, a boss 140 is formed on the outer surface of the shell 120 to provide additional strength to the shell 120 at this area of stress The through-bore 145 extends through the boss 140. Depending on the shape, material, and intended use of the swivel-lid protective case 100, additional strength 122 may be provided on the shell 120. Depending on the shape of the swivel-lid protective case 100, the boss 140 and through-bore 145 are dimensioned to allow the hinge strap 132 to rotate freely about the swivel connector 134 without interference from the shell 120.

FIGS. 4-11 illustrate one particular embodiment of the swivel-lid protective case 100 according to the invention. The particular embodiment of the swivel-lid protective case 100 shown in these figures is a protective case for a TomTom® GPS, and is accordingly constructed to have a rounded shell 120 and a relatively flat lid 110. It also has apertures on the back of the shell 120, as shown in FIG. 10, that allow the user to connect cables or other devices to the GPS. According to the invention, other embodiments of the invention may have differently sized and shaped lids 110 and shells 120. The case may include one or more differently sized cut-outs or apertures or have no apertures at all.

Figure 12A:
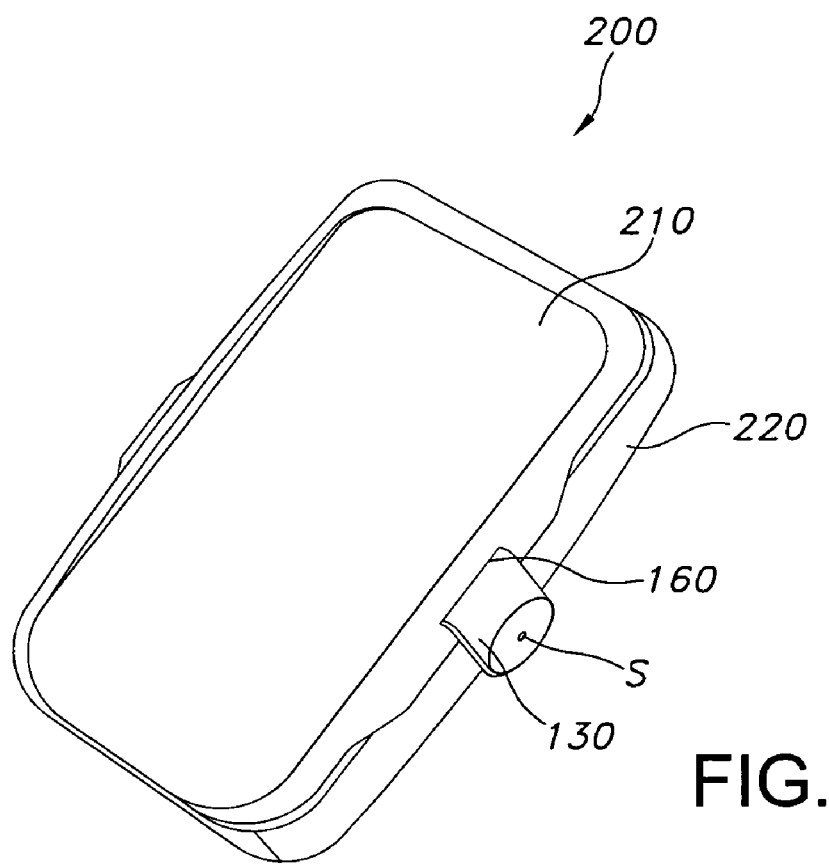
FIG. 12A is a perspective view of the swivel-lid protective case according to the invention, illustrating a different shape of the case.
Figure 12B:
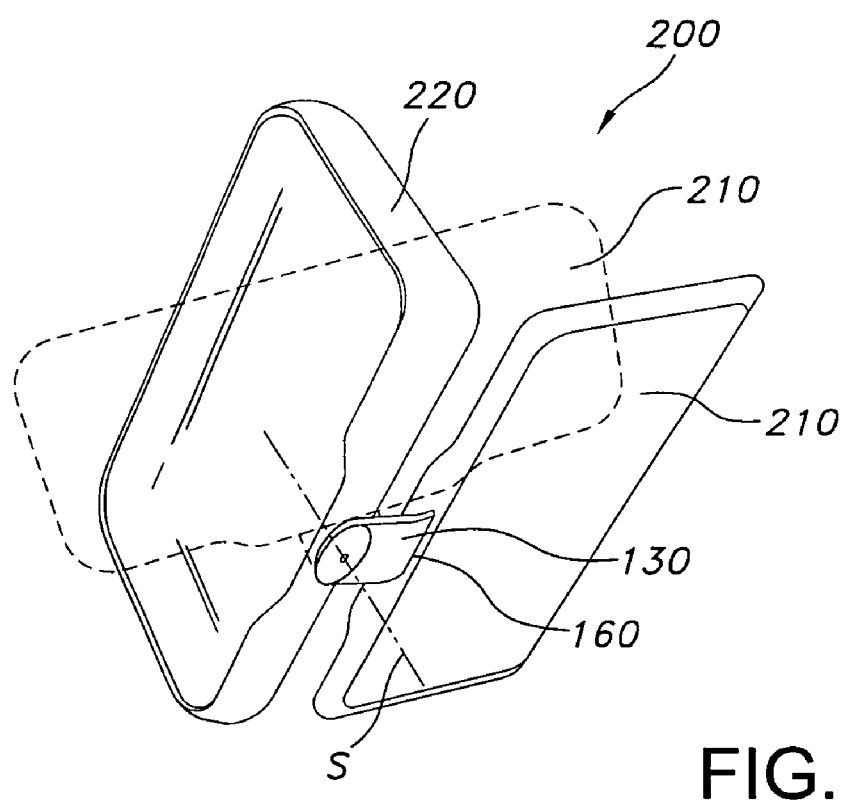
FIG. 12B is a perspective view of the swivel-lid protective case of FIG. 12A, showing the lid being folded to a storage position.

FIGS. 12A and 12B show perspective views of a swivel-lid protective case 200 that is functionally identical to the swivel-lid protective case 100 described above, but has a different shape. The swivel-lid protective case 200 is a relatively flat, rectangular case with a lid 210, and a shell 220, and the swivel means 130 that was described above. The lid 210 is hinged to the shell 220 by the hinge 160, which in turn is connected to the shell 220 by the swivel means 130. As indicated by the lid 210 shown in dashed lines and then with solid lines in FIG. 12B, the lid 210 swivels about the swivel point S and is foldable over the back of the shell 220 into a storage position in which the outer contour of the shell 220 nests within the inner contour of the lid 210. In FIG. 12B, the lid 210 has been opened, swiveled about the swivel point S and is in position to be folded down over the back of the shell 220.

The swivel-lid protective case 100 is preferably constructed of a rigid material, such as a metal, plastic, or other form-rigid material that provides the necessary rigidity and strength to protect the device stored within the case. The inside of the swivel-lid protective case 100 may be lined with a material that cushions, supports, holds in place the device being held by the case and/or provides some shock absorption.

It is understood that the embodiments described herein are merely illustrative of the present invention. Variations in the construction of the swivel-lid protective case may be contemplated by one skilled in the art without limiting the intended scope of the invention herein disclosed and as defined by the following claims.

What is claimed is:

1. A swivel-lid protective case comprising:
a shell, a lid, and a strap having a first end and a second end;
wherein said first end of said strap is rotatably attached to said lid by a hinge means and said second end is rotatably attached to said shell by a swivel connection means;
wherein said lid is openable and closable relative to said shell by rotating said lid about said hinge means about a hinge axis that is defined by a hinge pin and rotatable about a swivel axis by swiveling said strap about a swivel post of said swivel connection means, wherein said swivel axis is non-parallel with said hinge axis;
wherein said shell has an outer surface on a rear face and said lid has an inner surface;
wherein, when said lid is raised above said shell, said lid is rotatable about said swivel axis to bring said inner surface of said lid facing in a direction toward said rear face of said shell; and
wherein said lid is then foldable about said hinge so that said outer surface of said shell nests within said inner surface of said lid.

2. The swivel-lid protective case of claim 1, further comprising a case closure means for holding said lid closed against said shell.

* * * * *